(12) United States Patent
Tu

(10) Patent No.: US 10,983,318 B2
(45) Date of Patent: Apr. 20, 2021

(54) OPTICAL ELEMENTS

(71) Applicant: VisEra Technologies Company Limited, Hsin-Chu (TW)

(72) Inventor: Zong-Ru Tu, Zhubei (TW)

(73) Assignee: VISERA TECHNOLOGIES COMPANY LIMITED, Hsin-Chu (TW)

( * ) Notice: Subject to any disclaimer, the term of this patent is extended or adjusted under 35 U.S.C. 154(b) by 211 days.

(21) Appl. No.: 16/052,901

(22) Filed: Aug. 2, 2018

(65) Prior Publication Data
US 2020/0041775 A1 Feb. 6, 2020

(51) Int. Cl.
*G02B 19/00* (2006.01)
*G02B 1/11* (2015.01)

(52) U.S. Cl.
CPC ............ *G02B 19/0009* (2013.01); *G02B 1/11* (2013.01)

(58) Field of Classification Search
CPC ....... G02B 19/0009; G02B 1/11; G02B 5/201
See application file for complete search history.

(56) References Cited

U.S. PATENT DOCUMENTS 7,524,690 B2  4/2009  Ko et al.
9,991,302 B1  6/2018  Lin et al.

FOREIGN PATENT DOCUMENTS

CN       108807443 A    11/2018
JP       2006-140413 A   6/2006
JP       2010-226090 A  10/2010
TW         201735244 A  10/2017
WO    WO 2013/046531 A1  4/2013

OTHER PUBLICATIONS

Japanese Office Action Based on Corresponding Application No. 2018-239857; dated Jan. 14, 2020.

*Primary Examiner* — Jack Dinh
(74) *Attorney, Agent, or Firm* — Muncy, Geissler, Olds & Lowe, P.C.

(57) ABSTRACT

An optical element is provided. The optical element includes a substrate, a plurality of metal grids formed on the substrate, a patterned organic layer formed on the plurality of metal grids, a color filter surrounded by the patterned organic layer, and a light collection layer formed between the color filter and the substrate, and surrounded by the patterned organic layer. The refractive index of the light collection layer is greater than that of the patterned organic layer.

20 Claims, 5 Drawing Sheets

OPTICAL ELEMENTS

BACKGROUND OF THE INVENTION

Field of the Invention

The invention relates to an optical element, and more particularly to an optical element with a specific light collection layer formed between the color filter and the substrate.

Description of the Related Art

In an optical element with a composite metal grid (CMG)-type structure, a microlens placed above the color filters is required. In an optical element with a wave guide color filter (WGCF)-type structure, instead of the microlens, a low-refractive-index material surrounding the color filters is used to form a wave guide structure.

However, in an optical element with a wave guide color filter (WGCF)-type structure, due to the absorption of oblique light by metal grids, the quantum effect (QE) of the current pixel is dropped, especially with pixels located in the peripheral region of the substrate.

Therefore, development of an optical element with a wave guide color filter (WGCF)-type structure capable of improving the quantum effect (QE) and keeping low cross-talk between color filters is desirable.

BRIEF SUMMARY OF THE INVENTION

In accordance with one embodiment of the invention, an optical element is provided. The optical element includes a substrate, a plurality of metal grids, a patterned organic layer, a color filter, and a light collection layer. The metal grids are formed on the substrate. The patterned organic layer is formed on the metal grids. The color filter is surrounded by the patterned organic layer. The light collection layer is formed between the color filter and the substrate, and surrounded by the patterned organic layer. Specifically, the refractive index of the light collection layer is greater than that of the patterned organic layer.

In some embodiments, the refractive index of the patterned organic layer is in a range from about 1.2 to about 1.5.

In some embodiments, the color filter is a blue (B) color filter or a green (G) color filter.

In some embodiments, the color filter comprises a red (R) color filter, a green (G) color filter or a blue (B) color filter.

In some embodiments, the refractive index of the light collection layer is greater than that of the color filter.

In some embodiments, the refractive index of the light collection layer is in a range from about 1.6 to about 1.9.

In some embodiments, the light collection layer has a light-focusing profile.

In some embodiments, the light collection layer has a shape that is a curve, a taper or a polygon.

In some embodiments, when the light collection layer has a shape that is a curve, a taper or a polygon, the height of the light collection layer is less than half that of the color filter.

In some embodiments, when the light collection layer has a shape that is a curve, a taper or a polygon, the width of the surface which is in contact with the color filter of the light collection layer is defined as the greatest width.

In some embodiments, the greatest width of the light collection layer is greater than one quarter of the width of the color filter and less than or equal to the width of the color filter.

In some embodiments, when the light collection layer is curved, the width of the light collection layer reduces gradually in a direction away from the color filter.

In some embodiments, when the light collection layer is tapered, the width of the light collection layer reduces gradually in a direction away from the color filter.

In some embodiments, when the light collection layer is a polygon, the width of the light collection layer reduces stepwise in a direction away from the color filter.

In some embodiments, the light collection layer comprises a plurality of separated portions formed on the color filter.

In some embodiments, the distance between the two separated portions of the light collection layer reduces gradually from both sides to the center of the color filter in a horizontal direction.

In some embodiments, the refractive index of the light collection layer increases gradually from both sides to the center of the light collection layer in a horizontal direction.

In some embodiments, the present optical element further comprises an oxide layer covering the metal grid.

In some embodiments, the present optical element further comprises a planarization layer formed on the patterned organic layer and the color filter.

In some embodiments, the present optical element further comprises an anti-reflection layer formed on the planarization layer.

In the present invention, a specific high-refractive-index (high-n) light collection layer (ex. n=1.6-1.9) is disposed between the color filter and the substrate. The refractive index of the light collection layer is higher than that of adjacent materials. By disposing the specific light collection layer, the QE peaks of the blue (B) color filter and the green (G) color filter located in the peripheral region of the substrate are thus respectively improved, for example, to about 3% and 1%. The present optical element with the light collection layer also maintains low cross-talk between the color filters. In addition, the light collection layer can be disposed in single or multiple pixels in accordance with the demands on products. The light collection layer comprises various suitable shapes, for example, curves, tapers, polygons and other shapes with the same light-focusing profile. The specific dimensions of the light collection layer are required. For example, the height of the light collection layer is less than half that of the color filter. The width of the surface which is in contact with the color filter of the light collection layer is defined as the greatest width, and the greatest width of the light collection layer is limited to, for example, greater than one quarter of the width of the color filter and less than or equal to the width of the color filter, to prevent the light that was originally going to neighboring pixels from being absorbed by the light collection layer in the current pixel.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
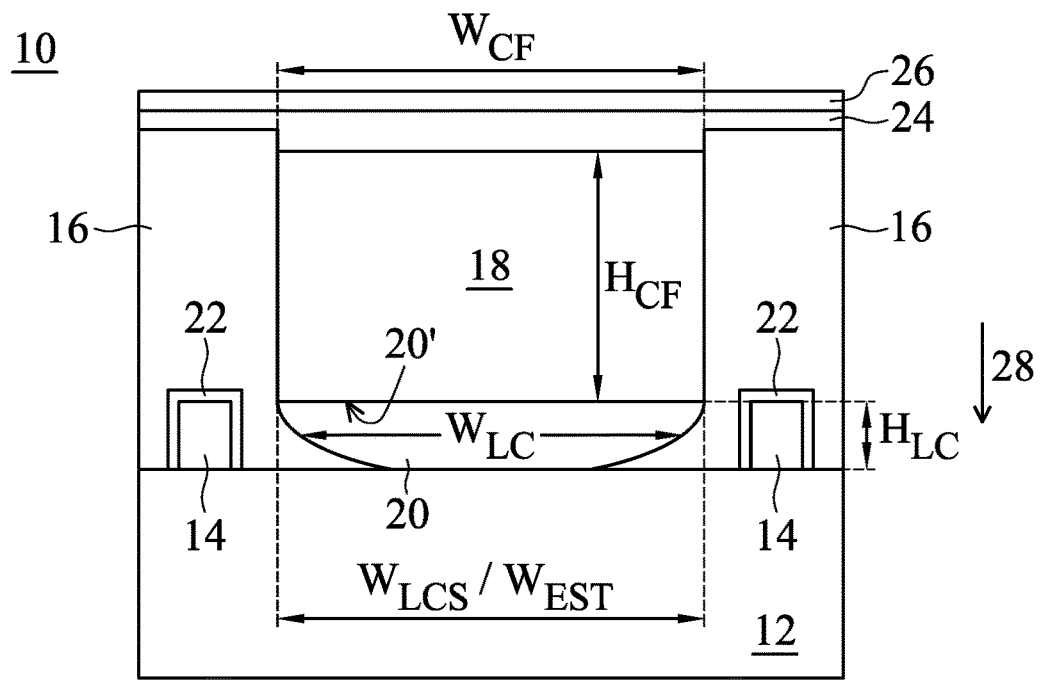
FIG. 1 is a cross-sectional view of an optical element in accordance with one embodiment of the invention.

Referring to FIG. 1, in accordance with one embodiment of the invention, an optical element 10 is provided. FIG. 1 shows a cross-sectional view of the optical element 10.

The optical element 10 includes a substrate 12, a plurality of metal grids 14, a patterned organic layer 16, a color filter 18 and a light collection layer 20. The metal grids 14 are formed on the substrate 12. The patterned organic layer 16 is formed on the metal grids 14. The color filter 18 is surrounded by the patterned organic layer 16. The light collection layer 20 is formed between the color filter 18 and the substrate 12, and surrounded by the patterned organic layer 16. Specifically, the refractive index of the light collection layer 20 is greater than the refractive index of the patterned organic layer 16. In addition, the light collection layer 20 has a specific shape with a light-focusing profile, as shown in FIG. 1.

In some embodiments, the refractive index of the patterned organic layer 16 is in a range from about 1.2 to about 1.5.

In some embodiments, the color filter 18 is a blue (B) color filter or a green (G) color filter.

In some embodiments, the color filter 18 comprises a red (R) color filter, a green (G) color filter or a blue (B) color filter.

In some embodiments, the light collection layer 20 is located underneath one kind of color filter, for example blue (B) color filters or green (G) color filters.

In some embodiments, the light collection layer 20 is located underneath two kinds of color filters, for example blue (B) color filters and green (G) color filters.

In some embodiments, the light collection layer 20 is located underneath all kinds of color filters, for example red (R) color filters, green (G) color filters and blue (B) color filters.

In some embodiments, the refractive index of the light collection layer 20 is greater than the refractive index of the color filter 18.

In some embodiments, the refractive index of the light collection layer 20 is in a range from about 1.6 to about 1.9.

The profile and specific dimensions of the light collection layer 20 are described in detail below.

In FIG. 1, the light collection layer 20 is curved.

In FIG. 1, the height "$H_{LC}$" of the light collection layer 20 is less than half the height "$H_{CF}$" of the color filter 18.

In FIG. 1, the width "$W_{LCS}$" of the surface 20' which is in contact with the color filter 18 of the light collection layer 20 is defined as the greatest width "$W_{EST}$".

In some embodiments, the greatest width "$W_{EST}$" of the light collection layer 20 is greater than one quarter of the width "$W_{CF}$" of the color filter 18 and less than or equal to the width "$W_{CF}$" of the color filter 18.

In FIG. 1, the greatest width "$W_{EST}$" of the light collection layer 20 is greater than one quarter of the width "$W_{CF}$" of the color filter 18 and equal to the width "$W_{CF}$" of the color filter 18.

In FIG. 1, the width "$W_{LC}$" of the light collection layer 20 reduces gradually in a direction 28 away from the color filter 18.

In some embodiments, the light collection layer 20 comprises another suitable shape with a light-focusing profile.

In FIG. 1, the optical element 10 further comprises an oxide layer 22 which covers the metal grid 14. The oxide layer 22 may be used as a protection layer for the metal grid 14.

In FIG. 1, the optical element 10 further comprises a transparent planarization layer 24 formed on the patterned organic layer 16 and the color filter 18.

In FIG. 1, the optical element 10 further comprises an anti-reflection layer 26 formed on the transparent planarization layer 24.

Figure 2:
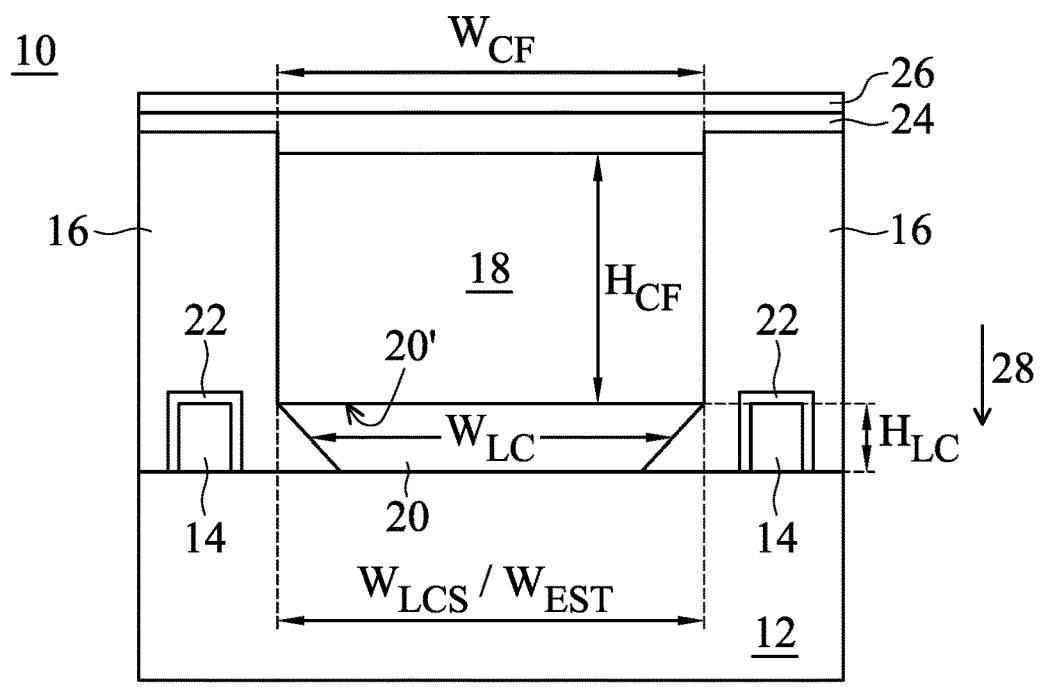
FIG. 2 is a cross-sectional view of an optical element in accordance with one embodiment of the invention.

Referring to FIG. 2, in accordance with one embodiment of the invention, an optical element 10 is provided. FIG. 2 shows a cross-sectional view of the optical element 10.

The optical element 10 includes a substrate 12, a plurality of metal grids 14, a patterned organic layer 16, a color filter 18 and a light collection layer 20. The metal grids 14 are formed on the substrate 12. The patterned organic layer 16 is formed on the metal grids 14. The color filter 18 is surrounded by the patterned organic layer 16. The light collection layer 20 is formed between the color filter 18 and the substrate 12, and surrounded by the patterned organic layer 16. Specifically, the refractive index of the light collection layer 20 is greater than the refractive index of the patterned organic layer 16. In addition, the light collection layer 20 has a specific shape with a light-focusing profile, as shown in FIG. 2.

In some embodiments, the refractive index of the patterned organic layer 16 is in a range from about 1.2 to about 1.5.

In some embodiments, the color filter 18 is a blue (B) color filter or a green (G) color filter.

In some embodiments, the color filter 18 comprises a red (R) color filter, a green (G) color filter or a blue (B) color filter.

In some embodiments, the light collection layer 20 is located underneath one kind of color filter, for example blue (B) color filters or green (G) color filters.

In some embodiments, the light collection layer 20 is located underneath two kinds of color filters, for example blue (B) color filters and green (G) color filters.

In some embodiments, the light collection layer 20 is located underneath all kinds of color filters, for example red (R) color filters, green (G) color filters and blue (B) color filters.

In some embodiments, the refractive index of the light collection layer 20 is greater than the refractive index of the color filter 18.

In some embodiments, the refractive index of the light collection layer 20 is in a range from about 1.6 to about 1.9.

The profile and specific dimensions of the light collection layer 20 are described in detail below.

In FIG. 2, the light collection layer 20 is tapered.

In FIG. 2, the height "$H_{LC}$" of the light collection layer 20 is less than half the height "$H_{CF}$" of the color filter 18.

In FIG. 2, the width "$W_{LCS}$" of the surface 20' which is in contact with the color filter 18 of the light collection layer 20 is defined as the greatest width "$W_{EST}$".

In some embodiments, the greatest width "$W_{EST}$" of the light collection layer 20 is greater than one quarter of the width "$W_{CF}$" of the color filter 18 and less than or equal to the width "$W_{CF}$" of the color filter 18.

In FIG. 2, the greatest width "$W_{EST}$" of the light collection layer 20 is greater than one quarter of the width "$W_{CF}$" of the color filter 18 and equal to the width "$W_{CF}$" of the color filter 18.

In FIG. 2, the width "$W_{LC}$" of the light collection layer 20 reduces gradually in a direction 28 away from the color filter 18.

In some embodiments, the light collection layer 20 comprises another suitable shape with a light-focusing profile.

In FIG. 2, the optical element 10 further comprises an oxide layer 22 which covers the metal grid 14. The oxide layer 22 may be used as a protection layer for the metal grid 14.

In FIG. 2, the optical element 10 further comprises a transparent planarization layer 24 formed on the patterned organic layer 16 and the color filter 18.

In FIG. 2, the optical element 10 further comprises an anti-reflection layer 26 formed on the transparent planarization layer 24.

Figure 3:
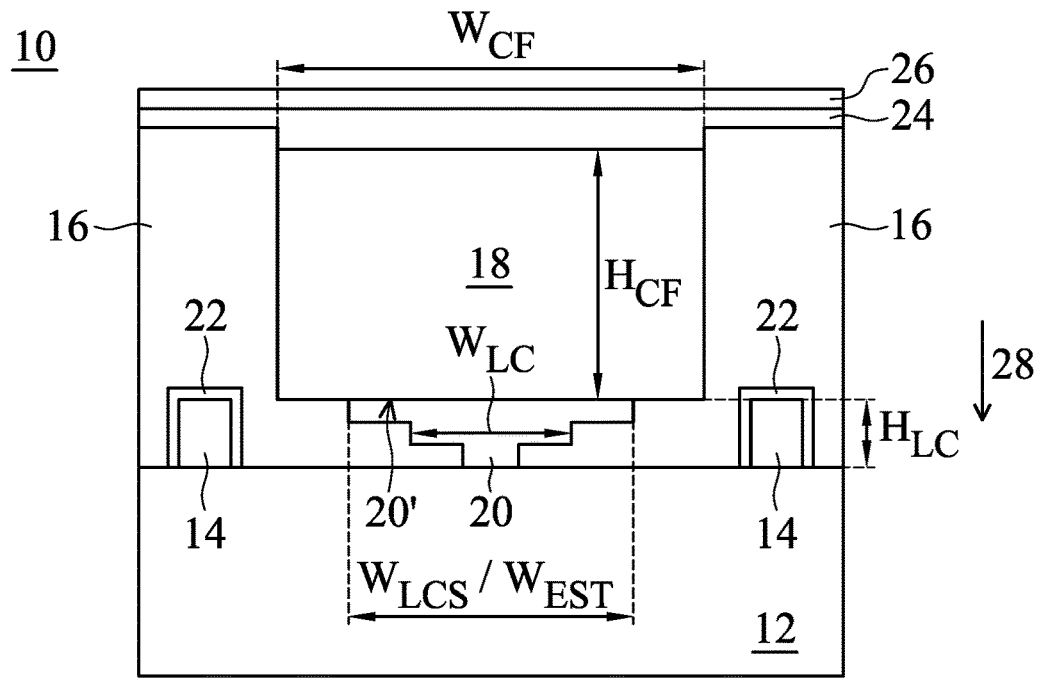
FIG. 3 is a cross-sectional view of an optical element in accordance with one embodiment of the invention.

Referring to FIG. 3, in accordance with one embodiment of the invention, an optical element 10 is provided. FIG. 3 shows a cross-sectional view of the optical element 10.

The optical element 10 includes a substrate 12, a plurality of metal grids 14, a patterned organic layer 16, a color filter 18 and a light collection layer 20. The metal grids 14 are formed on the substrate 12. The patterned organic layer 16 is formed on the metal grids 14. The color filter 18 is surrounded by the patterned organic layer 16. The light collection layer 20 is formed between the color filter 18 and the substrate 12, and surrounded by the patterned organic layer 16. Specifically, the refractive index of the light collection layer 20 is greater than the refractive index of the patterned organic layer 16. In addition, the light collection layer 20 has a specific shape with a light-focusing profile, as shown in FIG. 3.

In some embodiments, the refractive index of the patterned organic layer 16 is in a range from about 1.2 to about 1.5.

In some embodiments, the color filter 18 is a blue (B) color filter or a green (G) color filter.

In some embodiments, the color filter 18 comprises a red (R) color filter, a green (G) color filter or a blue (B) color filter.

In some embodiments, the light collection layer 20 is located underneath one kind of color filter, for example blue (B) color filters or green (G) color filters.

In some embodiments, the light collection layer 20 is located underneath two kinds of color filters, for example blue (B) color filters and green (G) color filters.

In some embodiments, the light collection layer 20 is located underneath all kinds of color filters, for example red (R) color filters, green (G) color filters and blue (B) color filters.

In some embodiments, the refractive index of the light collection layer 20 is greater than the refractive index of the color filter 18.

In some embodiments, the refractive index of the light collection layer 20 is in a range from about 1.6 to about 1.9.

The profile and specific dimensions of the light collection layer 20 are described in detail below.

In FIG. 3, the light collection layer 20 is a polygon.

In FIG. 3, the height "$H_{LC}$" of the light collection layer 20 is less than half the height "$H_{CF}$" of the color filter 18.

In FIG. 3, the width "$W_{LCS}$" of the surface 20' which is in contact with the color filter 18 of the light collection layer 20 is defined as the greatest width "$W_{EST}$".

In some embodiments, the greatest width "$W_{EST}$" of the light collection layer 20 is greater than one quarter of the width "$W_{CF}$" of the color filter 18 and less than or equal to the width "$W_{CF}$" of the color filter 18.

In FIG. 3, the greatest width "$W_{EST}$" of the light collection layer 20 is greater than one quarter of the width "$W_{CF}$" of the color filter 18 and less than the width "$W_{CF}$" of the color filter 18.

In FIG. 3, the width "$W_{LC}$" of the light collection layer 20 reduces stepwise in a direction 28 away from the color filter 18.

In some embodiments, the light collection layer 20 comprises another suitable shape with a light-focusing profile.

In FIG. 3, the optical element 10 further comprises an oxide layer 22 which covers the metal grid 14. The oxide layer 22 may be used as a protection layer for the metal grid 14.

In FIG. 3, the optical element 10 further comprises a transparent planarization layer 24 formed on the patterned organic layer 16 and the color filter 18.

In FIG. 3, the optical element 10 further comprises an anti-reflection layer 26 formed on the transparent planarization layer 24.

Figure 4:
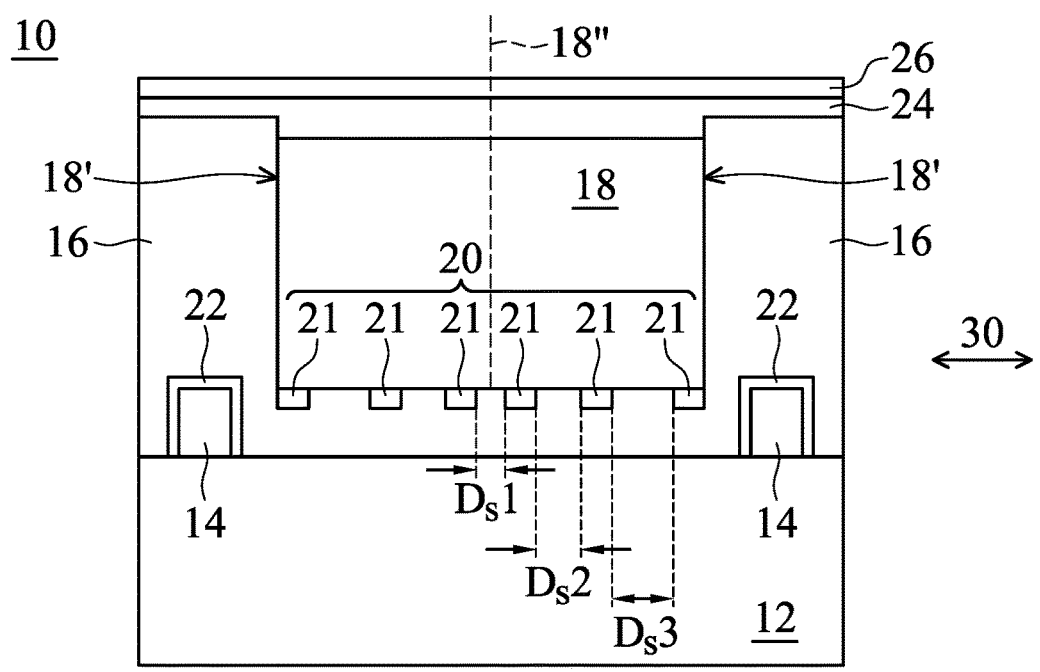
FIG. 4 is a cross-sectional view of an optical element in accordance with one embodiment of the invention.

Referring to FIG. 4, in accordance with one embodiment of the invention, an optical element 10 is provided. FIG. 4 shows a cross-sectional view of the optical element 10.

The optical element 10 includes a substrate 12, a plurality of metal grids 14, a patterned organic layer 16, a color filter 18 and a light collection layer 20. The metal grids 14 are formed on the substrate 12. The patterned organic layer 16 is formed on the metal grids 14. The color filter 18 is surrounded by the patterned organic layer 16. The light collection layer 20 is formed between the color filter 18 and the substrate 12, and surrounded by the patterned organic layer 16. Specifically, the refractive index of the light collection layer 20 is greater than the refractive index of the patterned organic layer 16. In addition, the light collection layer 20 has a specific shape with a light-focusing profile, as shown in FIG. 4.

In some embodiments, the refractive index of the patterned organic layer 16 is in a range from about 1.2 to about 1.5.

In some embodiments, the color filter 18 is a blue (B) color filter or a green (G) color filter.

In some embodiments, the color filter 18 comprises a red (R) color filter, a green (G) color filter or a blue (B) color filter.

In some embodiments, the light collection layer 20 is located underneath one kind of color filter, for example blue (B) color filters or green (G) color filters.

In some embodiments, the light collection layer 20 is located underneath two kinds of color filters, for example blue (B) color filters and green (G) color filters.

In some embodiments, the light collection layer 20 is located underneath all kinds of color filters, for example red (R) color filters, green (G) color filters and blue (B) color filters.

In some embodiments, the refractive index of the light collection layer 20 is greater than the refractive index of the color filter 18.

In some embodiments, the refractive index of the light collection layer 20 is in a range from about 1.6 to about 1.9.

The profile and specific dimensions of the light collection layer 20 are described in detail below.

In FIG. 4, the light collection layer 20 comprises a plurality of separated portions 21 formed on the color filter 18.

In FIG. 4, the distance (e.g., Ds1, Ds2 and Ds3) formed between two adjacent separated portions 21 of the light collection layer 20 reduces gradually from both sides 18' to the center 18" of the corresponding color filter 18 along the horizontal direction 30, for example, the distance Ds3 is greater than the distance Ds2, and the distance Ds2 is greater than the distance Ds1.

In some embodiments, the light collection layer 20 comprises another suitable shape with a light-focusing profile.

In FIG. 4, the optical element 10 further comprises an oxide layer 22 which covers the metal grid 14. The oxide layer 22 may be used as a protection layer for the metal grid 14.

In FIG. 4, the optical element 10 further comprises a transparent planarization layer 24 formed on the patterned organic layer 16 and the color filter 18.

In FIG. 4, the optical element 10 further comprises an anti-reflection layer 26 formed on the transparent planarization layer 24.

Figure 5:
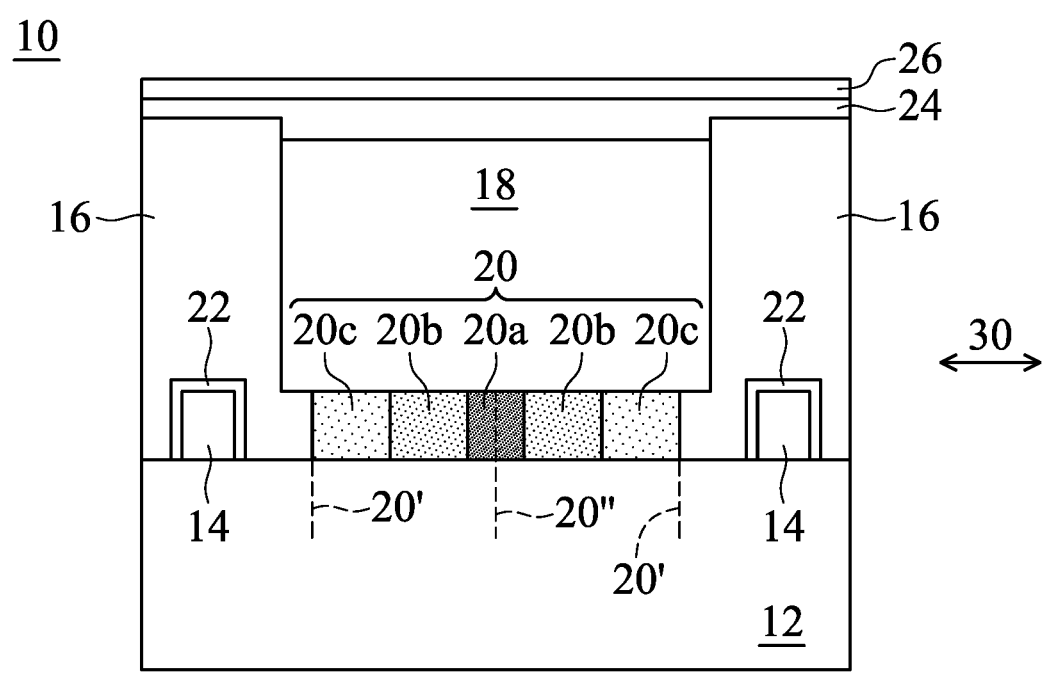
FIG. 5 is a cross-sectional view of an optical element in accordance with one embodiment of the invention.

Referring to FIG. 5, in accordance with one embodiment of the invention, an optical element 10 is provided. FIG. 5 shows a cross-sectional view of the optical element 10.

The optical element 10 includes a substrate 12, a plurality of metal grids 14, a patterned organic layer 16, a color filter 18 and a light collection layer 20. The metal grids 14 are formed on the substrate 12. The patterned organic layer 16 is formed on the metal grids 14. The color filter 18 is surrounded by the patterned organic layer 16. The light collection layer 20 is formed between the color filter 18 and the substrate 12, and surrounded by the patterned organic layer 16. Specifically, the refractive index of the light collection layer 20 is greater than the refractive index of the patterned organic layer 16. In addition, the light collection layer 20 has a specific light-focusing profile, as shown in FIG. 5.

In some embodiments, the refractive index of the patterned organic layer 16 is in a range from about 1.2 to about 1.5.

In some embodiments, the color filter 18 is a blue (B) color filter or a green (G) color filter.

In some embodiments, the color filter 18 comprises a red (R) color filter, a green (G) color filter or a blue (B) color filter.

In some embodiments, the light collection layer 20 is located underneath one kind of color filter, for example blue (B) color filters or green (G) color filters.

In some embodiments, the light collection layer 20 is located underneath two kinds of color filters, for example blue (B) color filters and green (G) color filters.

In some embodiments, the light collection layer 20 is located underneath all kinds of color filters, for example red (R) color filters, green (G) color filters and blue (B) color filters.

In some embodiments, the refractive index of the light collection layer 20 is greater than the refractive index of the color filter 18.

In some embodiments, the refractive index of the light collection layer 20 is in a range from about 1.6 to about 1.9.

The profile of the light collection layer 20 is described in detail below.

In FIG. 5, the light collection layer 20 comprises a plurality of regions (20a, 20b and 20c) with various refractive indexes. The region 20a, the regions 20b and the regions 20c are symmetrically distributed from the center 20" to both sides 20' of the light collection layer 20, as shown in FIG. 5.

In FIG. 5, the refractive index of the light collection layer 20 increases gradually from both sides 20' to the center 20" of the light collection layer 20 along the horizontal direction 30. That is, in the light collection layer 20, the refractive index of the region 20a is greater than that of the region 20b, and the refractive index of the region 20b is greater than that of the region 20c.

In some embodiments, the light collection layer 20 comprises another suitable shape with a light-focusing profile.

In FIG. 5, the optical element 10 further comprises an oxide layer 22 which covers the metal grid 14. The oxide layer 22 may be used as a protection layer for the metal grid 14.

In FIG. 5, the optical element 10 further comprises a transparent planarization layer 24 formed on the patterned organic layer 16 and the color filter 18.

In FIG. 5, the optical element 10 further comprises an anti-reflection layer 26 formed on the transparent planarization layer 24.

Example 1

QE Spectrum Improvement of the Optical Element

Figure 6:
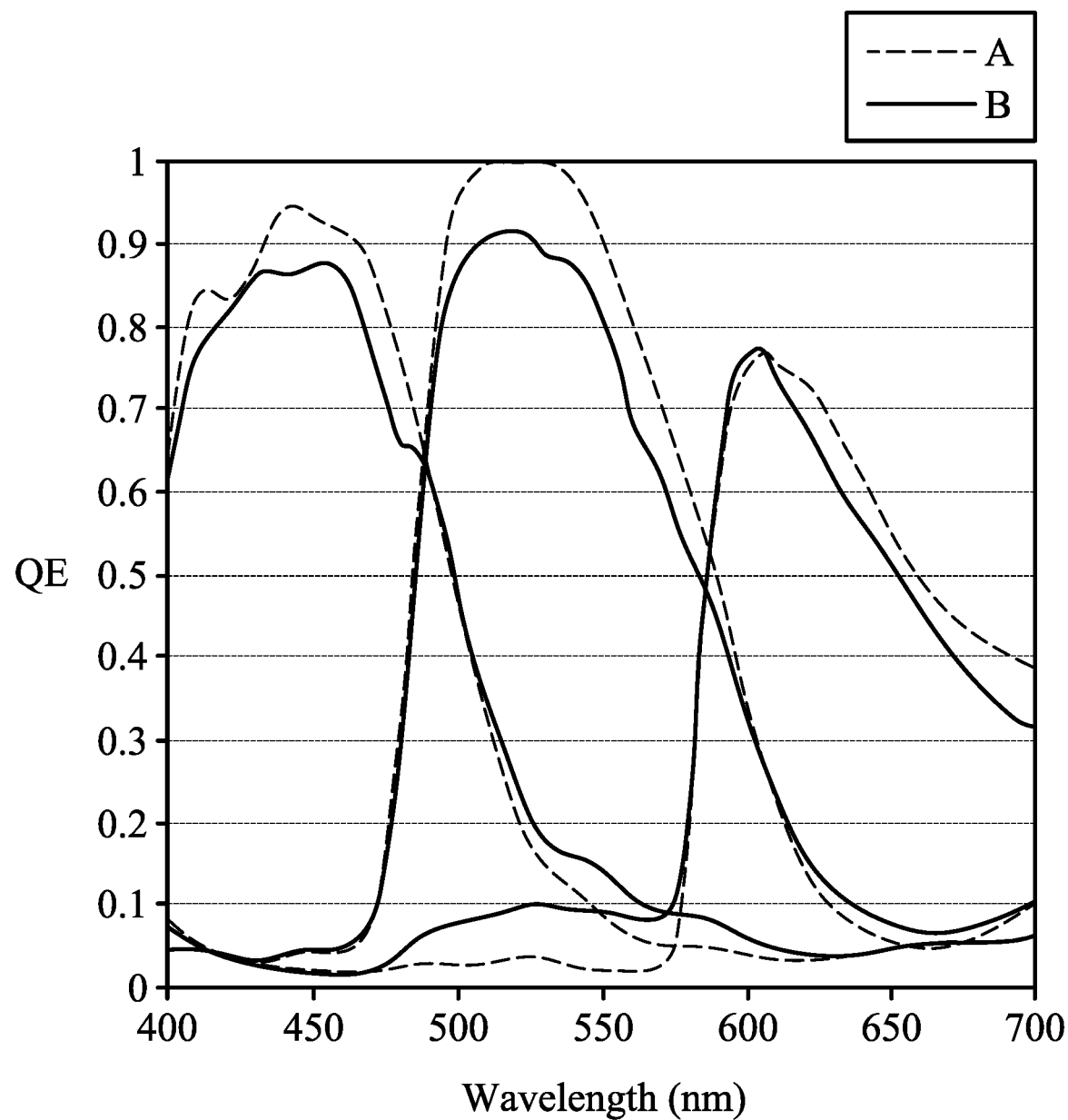
FIG. 6 shows a QE spectrum of a conventional optical element.

In this example, QE improvement, especially of the blue (B) color filter and the green (G) color filter located in the peripheral region of the substrate, is acknowledged by disposing the specific light collection layer in the optical element. First, referring to FIG. 6, the curve "A" shows the QE spectrum of the color filters (R/GB) located at the central region of the substrate, and the curve "B" shows the QE spectrum of the color filters (R/GB) located in the peripheral region of the substrate. Apparently, the QE peaks of the blue (B) color filter and the green (G) color filter located in the peripheral region of the substrate are dropped.

Figure 7:
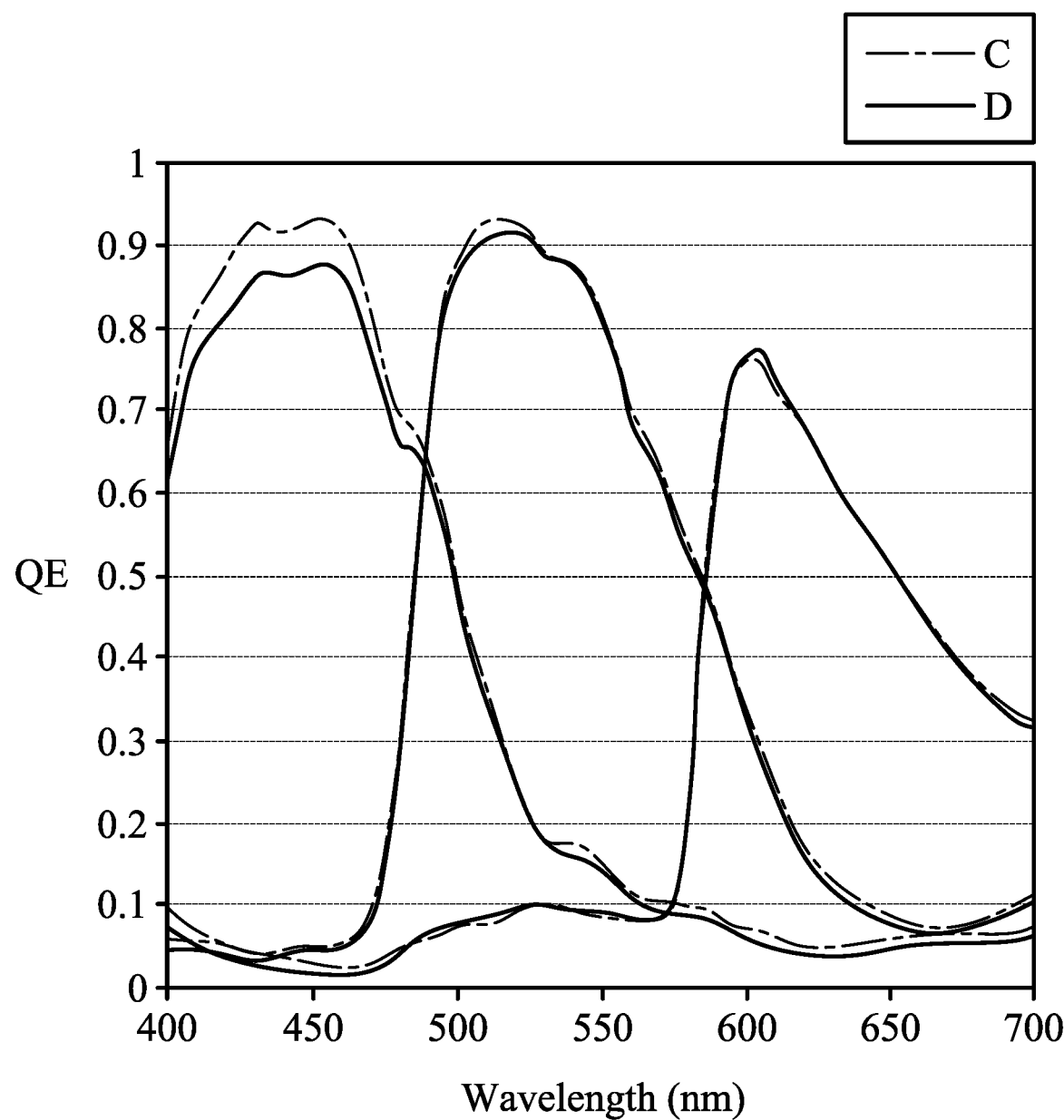
FIG. 7 shows a QE spectrum of an optical element in accordance with one embodiment of the invention.

Next, referring to FIG. 7, the curve "C" shows the QE spectrum of the color filters (R/GB) located in the peripheral region of the substrate of the present optical element that includes the specific light collection layer shown in FIG. 1. The curve "D" shows the QE spectrum of the color filters (R/GB) located in the peripheral region of the substrate of the optical element without arrangement of a light collection layer. The QE spectrum (the curve "C") built by the present optical element that includes the specific light collection layer shown in FIG. 1 therein shows that the QE peak of the blue (B) color filter is a significant improvement of about 3% over that in the curve "D". Also, the QE peak of the green (G) color filter is a mild improvement of about 1% over that in the curve "D". In addition, the QE spectrum (the curve "C") also shows that the low cross-talk between the color filters is maintained.

In the present invention, a specific high-refractive-index (high-n) light collection layer (ex. n=1.6-1.9) is disposed between the color filter and the substrate. The refractive index of the light collection layer is higher than that of adjacent materials. By disposing the specific light collection layer, the QE peaks of the blue (B) color filter and the green (G) color filter located in the peripheral region of the substrate are thus respectively improved, for example, to about 3% and 1%. The present optical element with the light collection layer also maintains low cross-talk between the color filters. In addition, the light collection layer can be disposed in single or multiple pixels in accordance with the demands on products. The light collection layer comprises various suitable shapes, for example, curves, tapers, polygons and other shapes with the same light-focusing profile. The specific dimensions of the light collection layer are required. For example, the height of the light collection layer is less than half that of the color filter. The width of the surface which is in contact with the color filter of the light collection layer is defined as the greatest width, and the greatest width of the light collection layer is limited to, for example, greater than one quarter of the width of the color filter and less than or equal to the width of the color filter, to prevent the light that was originally going to neighboring pixels from being absorbed by the light collection layer in the current pixel.

While the invention has been described by way of example and in terms of preferred embodiment, it should be understood that the invention is not limited thereto. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An optical element, comprising:
   a substrate;
   a plurality of metal grids formed on the substrate;
   a patterned organic layer formed on the plurality of metal grids;
   a color filter surrounded by the patterned organic layer; and
   a light collection layer formed between the color filter and the substrate, and surrounded by the patterned organic layer, wherein a refractive index of the light collection layer is greater than that of the patterned organic layer.

2. The optical element as claimed in claim 1, wherein the refractive index of the patterned organic layer is in a range from about 1.2 to about 1.5.

3. The optical element as claimed in claim 1, wherein the color filter is a blue color filter or a green color filter.

4. The optical element as claimed in claim 1, wherein the color filter comprises a red color filter, a green color filter or a blue color filter.

5. The optical element as claimed in claim 1, wherein the refractive index of the light collection layer is greater than that of the color filter.

6. The optical element as claimed in claim 1, wherein the refractive index of the light collection layer is in a range from about 1.6 to about 1.9.

7. The optical element as claimed in claim 1, wherein the light collection layer has a light-focusing profile.

8. The optical element as claimed in claim 7, wherein the light collection layer has a shape that is a curve, a taper or a polygon.

9. The optical element as claimed in claim 8, wherein a height of the light collection layer is less than half that of the color filter.

10. The optical element as claimed in claim 8, wherein a width of a surface which is in contact with the color filter of the light collection layer is defined as a greatest width.

11. The optical element as claimed in claim 10, wherein the greatest width of the light collection layer is greater than one quarter of a width of the color filter and less than or equal to the width of the color filter.

12. The optical element as claimed in claim 10, wherein the light collection layer is curved, and a width of the light collection layer reduces gradually in a direction away from the color filter.

13. The optical element as claimed in claim 10, wherein the light collection layer is tapered, and a width of the light collection layer reduces gradually in a direction away from the color filter.

14. The optical element as claimed in claim 10, wherein the light collection layer is a polygon, and a width of the light collection layer reduces stepwise in a direction away from the color filter.

15. The optical element as claimed in claim 7, wherein the light collection layer comprises a plurality of separated portions formed on the color filter.

16. The optical element as claimed in claim 15, wherein a distance between the two separated portions of the light collection layer reduces gradually from both sides to a center of the color filter in a horizontal direction.

17. The optical element as claimed in claim 7, wherein the refractive index of the light collection layer increases gradually from both sides to a center of the light collection layer in a horizontal direction.

18. The optical element as claimed in claim 1, further comprising an oxide layer covering the metal grid.

19. The optical element as claimed in claim 1, further comprising a planarization layer formed on the patterned organic layer and the color filter.

20. The optical element as claimed in claim 19, further comprising an anti-reflection layer formed on the planarization layer.

* * * * *